United States Patent
Miyata et al.

(10) Patent No.: US 10,546,671 B2
(45) Date of Patent: Jan. 28, 2020

(54) VOLTAGE NONLINEAR RESISTOR

(71) Applicant: HITACHI, LTD., Tokyo (JP)

(72) Inventors: Motoyuki Miyata, Tokyo (JP); Junichiro Miyake, Tokyo (JP); Koichi Tsuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 287 days.

(21) Appl. No.: 15/409,776

(22) Filed: Jan. 19, 2017

(65) Prior Publication Data

US 2017/0207009 A1 Jul. 20, 2017

(30) Foreign Application Priority Data

Jan. 20, 2016 (JP) .................... 2016-008737

(51) Int. Cl.
*H01C 7/112* (2006.01)
*C04B 35/453* (2006.01)

(52) U.S. Cl.
CPC ............ *H01C 7/112* (2013.01); *C04B 35/453* (2013.01); *C04B 2235/3206* (2013.01); *C04B 2235/3217* (2013.01); *C04B 2235/3225* (2013.01); *C04B 2235/3241* (2013.01); *C04B 2235/3262* (2013.01); *C04B 2235/3275* (2013.01); *C04B 2235/3279* (2013.01); *C04B 2235/3284* (2013.01); *C04B 2235/3291* (2013.01); *C04B 2235/3294* (2013.01); *C04B 2235/3298* (2013.01); *C04B 2235/3409* (2013.01); *C04B 2235/3418* (2013.01); *C04B 2235/77* (2013.01); *C04B 2235/85* (2013.01)

(58) Field of Classification Search
CPC ..................................................... H01C 7/112
See application file for complete search history.

(56) References Cited

U.S. PATENT DOCUMENTS

| | | | |
|---|---|---|---|
| 6,100,785 A | 8/2000 | Kato et al. | |
| 8,207,813 B2 * | 6/2012 | Tan ........................ | B32B 18/00 |
| | | | 252/519.51 |
| 2002/0121960 A1 | 9/2002 | Ando et al. | |
| 2013/0133183 A1 | 5/2013 | Lien et al. | |

FOREIGN PATENT DOCUMENTS

| | | |
|---|---|---|
| CN | 1421877 A | 6/2003 |
| JP | 04-139702 A | 5/1992 |
| JP | H10-270209 A | 10/1998 |
| JP | 2001-307909 A | 11/2001 |

(Continued)

OTHER PUBLICATIONS

Machine translation of CN1421877A. Retrieved from https://patents.google.com/patent/CN1421877A/en?oq=Cn1421877 on Dec. 21, 2018 (Year: 2003).*

(Continued)

*Primary Examiner* — Matthew E. Hoban
(74) *Attorney, Agent, or Firm* — Volpe and Koenig, P.C.

(57) ABSTRACT

A voltage nonlinear resistor according to the present invention includes a sintered body consisting essentially of zinc oxide and containing bismuth, antimony, and boron as accessory components. The accessory components are bismuth oxide of 1.5 to 2.5 mol %, antimony oxide of 1 to 2 mol %, and boron oxide of 0.3 mol % or less in terms of oxides.

5 Claims, 9 Drawing Sheets

(56) References Cited

FOREIGN PATENT DOCUMENTS

JP      2007-329175 A    12/2007
JP      2013-115431 A    6/2013

OTHER PUBLICATIONS

Kang. Microstructure and Electrical Properties of Doped ZnO Varistor Nanomaterials. Solid State Phenomena vols. 99-100 (2004) pp. 127-132 (Year: 2004).*
Chinese Office Action dated Apr. 4, 2018 for the Chinese Patent Application No. 201710041631.1.
Japanese Office Action dated Dec. 4, 2018 for the Japanese Patent Application No. 2016-008737.

* cited by examiner

VOLTAGE NONLINEAR RESISTOR

BACKGROUND OF THE INVENTION

1. Field of the Invention

The present invention relates to a voltage nonlinear resistor.

2. Description of the Related Art

In an electric power facility such as a substation, an overvoltage protection device such as a lightning arrester and a surge absorber is installed to protect a switchgear, a transformer, and the like from abnormal voltage caused by lightning or the like. In such an overvoltage protection device, a voltage nonlinear resistor exhibiting low resistance at the time of receiving abnormal voltage is used. As the voltage nonlinear resistor, a zinc oxide element (ZnO element) consisting essentially of zinc oxide (ZnO) and containing at least one additive is mainly used.

In recent years, for the purpose of facility miniaturization and cost reduction, the overvoltage protection device is required to be miniaturized. Along with this, the zinc oxide element used in the lightning arrester is also required to be miniaturized.

To miniaturize the zinc oxide element, consideration of an increase in operating start voltage, that is, varistor voltage, of the voltage nonlinear resistor is required. Also, when the zinc oxide element is miniaturized, the amount of electric energy to be applied per unit volume increases. Thus, an energy withstand characteristic and a voltage clamping ratio of the element need to be improved.

JP-10-270209-A considers improvement of the varistor voltage and the voltage clamping ratio. JP-10-270209-A discloses a voltage nonlinear resistor of a sintered substance of a composite consisting essentially of zinc oxide and containing a plurality of rare earth elements, at least one of which is selected from the group consisting of Eu, Gd, Tb, Dy, Ho, Y, Er, Tm, Yb, and Lu, and Bi and Sb, wherein spacing do (Å) between grains of the zinc oxide, provided from precipitation grains formed in the grains of the zinc oxide or on a grain boundary lies in the range of 2.85 Å≤d1≤2.91 Å, 1.83 Å≤d2≤1.89 Å, 1.77 Å≤d3≤1.82 Å, 1.56 Å≤d4≤1.61 Å, and 1.54 Å≤d5≤1.60 Å. The above literature is supposed to exert an effect of providing a voltage nonlinear resistor with large varistor voltage and a small large current area voltage clamping ratio.

SUMMARY OF THE INVENTION

Meanwhile, along with absorption of electric energy, the temperature of the zinc oxide element increases. When the resistance value of the element decreases along with the increase of the temperature, thermal runaway occurs. Thus, when the element is to be miniaturized, it is necessary to restrict changes of the resistance of the element along with temperature changes (to improve a temperature characteristic). The above literature does not refer to the improvement of the temperature characteristic.

In consideration of the above circumstances, the present invention provides a voltage nonlinear resistor in which varistor voltage, a voltage clamping ratio, and a temperature characteristic are balanced at a high level.

In order to solve the problem, the present invention provides a voltage nonlinear resistor including: a sintered body consisting essentially of zinc oxide and containing bismuth, antimony, and boron as accessory components, wherein the accessory components are bismuth oxide of 1.5 to 2.5 mol %, antimony oxide of 1 to 2 mol %, and boron oxide of 0.3 mol % or less in terms of oxides.

The present invention can provide a voltage nonlinear resistor in which varistor voltage, a voltage clamping ratio, and a temperature characteristic are balanced at a high level.

Other problems, configurations, and effects than those mentioned above will be apparent from the following description of embodiments.

DESCRIPTION OF THE PREFERRED EMBODIMENTS

Hereinbelow, embodiments of the present invention will be described in detail with reference to the drawings.

(1) Configuration of Voltage Nonlinear Resistor (ZnO Element)

Figure 1:
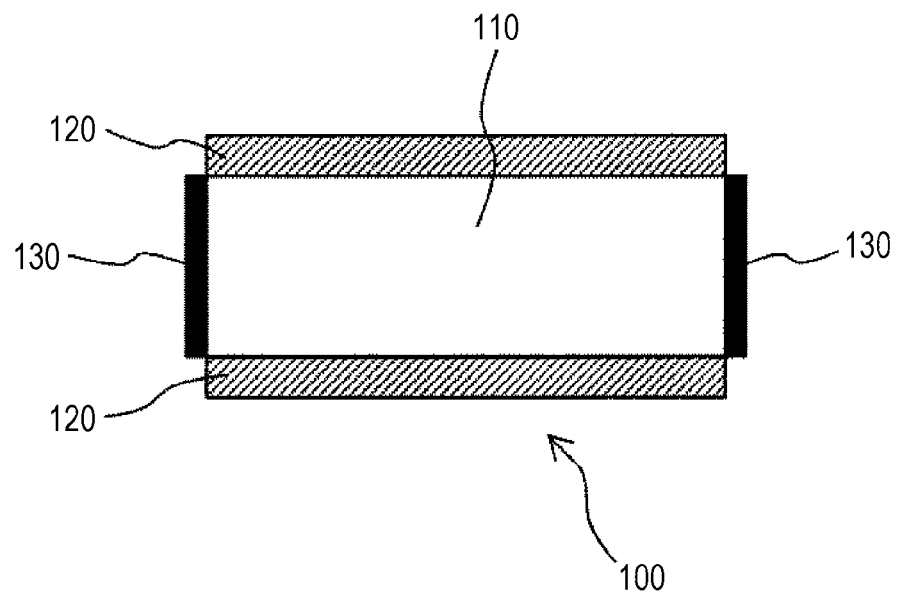
FIG. 1 is a schematic view illustrating an example of a voltage nonlinear resistor according to the present invention.

FIG. 1 is a schematic view illustrating an example of a voltage nonlinear resistor (hereinbelow referred to as "a ZnO element") according to the present invention. FIG. 1 is a front view of the voltage nonlinear resistor. A ZnO element 100 according to the present invention is configured to include a sintered body 110, electrodes 120 formed on upper and lower surfaces of this sintered body 110, and insulating layers 130 formed on side surfaces of the sintered body 110. The sintered body 110 may be in a cylindrical shape or in a hollow-centered cylindrical shape having a hollow therein. This ZnO element 100 is used in an overvoltage protection device such as a lightning arrester and a surge absorber.

The present inventors have conducted concerted study of a composition of the sintered body 110 directed toward causing three items of the characteristics of the ZnO element consisting of varistor voltage, a voltage clamping ratio, and a temperature characteristic to be balanced at a high level. As a result, the present inventors have discovered that the three items can be balanced at a high level by employing a predetermined composition of the sintered body 110. The present inventors have also discovered a correlation between physical property values at a grain boundary (interface state density and donor density at a grain boundary) and the voltage clamping ratio and a correlation between physical property values at a grain boundary and the temperature characteristic in the ZnO, which is a primary component of the sintered body 110.

First, components of the ZnO element 100 except the sintered body 110 will be described.

As a material for the electrodes 120, a conductive metal material such as aluminum (Al) and copper (Cu) or an alloy thereof can be used. A conductive organic material can also be used. A composite material of the aforementioned metal material and alloy and the aforementioned organic material can also be used.

As examples of a method for forming the electrodes 120, an arc spraying method, a plasma spraying method, a cold spraying method, a plating method, a dip coating method, and a spin coating method are raised. An appropriate forming method can be used in accordance with the material and the application. The thickness of the electrodes 120 is preferably 30 to 200 μm from a viewpoint of adhesion to the sintered body 110 and conductivity.

The insulating layers 130 are formed to prevent electric short circuit on the side surfaces of the sintered body 110 when current flows into the sintered body 110 via the electrodes 120. As a material for the insulating layers 130, an inorganic material such as a ceramic containing electrically insulating glass, an electrically insulating organic material, or a composite material thereof can be used.

Each of these insulating layers 130 is formed by applying or spraying the aforementioned material to the side surface of the sintered body 110 and thereafter conducting a thermal treatment that fits the material used as needed. The thickness of the insulating layers 130 is preferably 50 to 300 μm from a viewpoint of insulation performance, mechanical strength, and adhesion to the sintered body 110. Meanwhile, each of the insulating layers 130 may be a single layer of the aforementioned material or lamination of plural materials.

(2) Configuration of Sintered Body
(2.1) Composition of Sintered Body

The sintered body 110 constituting the ZnO element includes a ZnO grain phase constituted by grains of ZnO serving as a primary component, a spinel grain phase, a $Bi_2O_3$ phase, and the like.

The ZnO grain is a primary component constituting the sintered body 110, and the average grain diameter thereof is preferably 5 μm or less. The reason for this is that, in a case in which the diameter is longer than 5 μm, varistor voltage per unit thickness will be less than 400 V/mm, which will not contribute to miniaturization of the ZnO element 100 and a lightning arrester.

The spinel grain is a grain consisting essentially of $Zn_7Sb_2O_{12}$ and is formed mainly by ZnO and $Sb_2O_3$ in a sintering treatment. The spinel grain functions to control grain growth of the ZnO grains and to absorb impurities in raw material powder and partial additives. The average grain diameter of the spinel grain is preferably 1 μm or less. The reason for this is that, in a case in which the diameter is longer than 1 μm, a voltage clamping ratio will be more than 1.6.

The $Bi_2O_3$ phase is a component mainly existing at a grain boundary of the ZnO grains and exhibiting voltage nonlinearity. Also, in the sintering treatment, the $Bi_2O_3$ phase functions to accelerate grain growth of the ZnO grains and is involved in characteristic control of the ZnO grains at the grain boundary.

(2.2) Kinds and Contents of Accessory Components

As described above, the sintered body 110 is a ZnO-based ceramic material consisting essentially of ZnO. As for contents of accessory components (additives) contained in this ceramic material, the content of bismuth oxide ($Bi_2O_3$) is 1.5 to 2.5 mol %, the content of antimony oxide ($Sb_2O_3$) is 1.0 to 2 mol %, and the content of boron oxide ($B_2O_3$) is 0.3 mol % or less in terms of oxides.

Bismuth (Bi) is a component forming the aforementioned $Bi_2O_3$ phase mainly at the grain boundary of the ZnO and exhibiting voltage nonlinearity. The content thereof is preferably 1.5 to 2.5 mol %, and more preferably 1.7 to 2.2 mol %, in terms of $Bi_2O_3$. In a case in which the content is less than 1.5 mol %, the effect of improving the voltage clamping ratio cannot be obtained sufficiently. In a case in which the content is more than 2.5 mol %, the voltage clamping ratio will get worse.

Antimony (Sb) is a component mainly forming the ZnO and the spinel grains and effectively improving the varistor voltage and the voltage clamping ratio. The content thereof is preferably 1 to 2 mol %, and more preferably 1.4 to 1.8 mol %, in terms of $Sb_2O_3$. In a case in which the content is less than 1 mol %, the effect of improving the voltage clamping ratio cannot be obtained sufficiently. In a case in which the content is more than 2 mol %, the temperature characteristic will be lowered.

The content of boron (B) is preferably 0.3 mol % or less in terms of $B_2O_3$ from a viewpoint of improvement of the voltage clamping ratio and the temperature characteristic, and more preferably 0.15 mol % or less. In a case in which the content thereof is more than 0.3 mol %, the temperature characteristic will be lowered.

In addition to these components, manganese (Mn), cobalt (Co), chromium (Cr), nickel (Ni), aluminum (Al), silver (Ag), silicon (Si), magnesium (Mg), yttrium (Y), lanthanoid rare earth elements, and the like can arbitrarily be added.

The contents of Mn, Co, and Cr are preferably 0.1 to 1.5 mol % in terms of $MnCO_3$, $Co_3O_4$, and $Cr_2O_3$, respectively, from a viewpoint of improving the voltage clamping ratio and the temperature characteristic. The content of Ni is preferably 0.1 to 2 mol % in terms of NiO from a viewpoint of improving the voltage clamping ratio and the temperature characteristic. The content of Al is preferably 0.005 to 0.5 mol % in terms of Al $(NO_3)_3$ from a viewpoint of improving the voltage clamping ratio. The content of Ag is preferably 0.001 to 0.01 mol % in terms of $Ag_2O$ from a viewpoint of improving the voltage clamping ratio. Si is a component forming the ZnO and $Zn_2SiO_4$ and effectively improving the varistor voltage and the voltage clamping ratio. The content thereof is preferably 1.0 to 2.5 mol % in terms of $SiO_2$. The content of Mg is preferably 0.01 to 0.1 mol % in terms of MgO from a viewpoint of improving the voltage clamping ratio and the temperature characteristic. Additionally, a rare earth element (RE) of 2.5 mol % or less in terms of $RE_2O_3$ is preferably added from a viewpoint of improving the voltage clamping ratio and the temperature characteristic. The RE is preferably at least one or more kinds selected from yttrium (Y) and lanthanoid rare earth elements.

(3) Method for Preparing ZnO Element

Next, a method for preparing the ZnO element will be described. First, ZnO powder serving as a primary component and the aforementioned additives are weighed to have predetermined amounts, a solvent such as water and a dispersant are added, and a mixture is prepared with use of a wet grinding and mixing device. As the wet grinding and mixing device, a ball mill using balls and beads made of ceramic such as zirconia as grinding media, a circulation grinding device, or the like can be used.

The average grain diameter of the mixture is preferably 1 μm or less, and more preferably 0.5 μm or less. The reason for this is that, in a case in which the average grain diameter of the mixture is 1 μm or less, grain growth of the ZnO grains proceeds uniformly at the time of a below-mentioned sintering treatment, which enables uniformity of conduction paths in the ZnO element to be improved.

This mixture is supplied with an organic binder such as polyvinyl alcohol to prepare granulation slurry. This granulation slurry is heated and dried with use of a granulator to prepare granulation powder for molding. As the granulator, a rotating-disk-type or nozzle-spray-type spray drier can be used. The granulator can arbitrarily be selected in accordance with the grain diameter and the like of the granulation powder to be prepared.

The grain diameter of the granulation powder is preferably 10 μm to 300 μm, and more preferably 50 μm to 200 μm. The reason for this is that, in a case in which the diameter is less than 10 μm, fluidity of the granulation powder will be lowered at the time of below-mentioned molding, and a dense molded body cannot be obtained. In a case in which the diameter is more than 300 μm, spaces between the granulation powder grains will be large at the time of below-mentioned filling of a mold with the granulation powder, and a dense molded body cannot be obtained.

The prepared granulation powder is put into a mold and is press-formed into a predetermined shape with use of a molding machine such as a hydraulic press to prepare a molded body. The shape and dimension of the molded body are arbitrarily selected in accordance with the application, and description will be provided below, taking a cylindrical molded body illustrated in FIG. 1 as an example.

The prepared molded body is heated in the atmosphere at a predetermined temperature in the range of from 350° C. to 600° C. for one to two hours to conduct a degreasing treatment for removing the organic binder and the dispersant in the molded body. Subsequently, the molded body is heated at 950 to 1200° C. for one to five hours to conduct a sintering treatment, and the sintered body 110 is obtained. The temperature and time for the degreasing treatment can arbitrarily be set in accordance with the kind and amount of the organic binder to be added.

On the side circumferential surfaces of the obtained sintered body, the aforementioned insulating material is sprayed, applied, and thereafter thermally treated to form the insulating layers 130. A method for applying the insulating material can arbitrarily be selected in accordance with the shape and diameter of the sintered body from a spray coating method for spraying and forming the insulating material, a dip coating method for dipping the sintered body into a solution containing the insulating material, and the like.

After the upper and lower surfaces (circular surfaces) of the sintered body 110 provided with the insulating layers 130 are polished, the electrodes 120 are formed on these polished surfaces to prepare the ZnO element 100. A method for forming the electrodes can arbitrarily be selected in accordance with the shape and diameter of the sintered body and the material and application of the electrodes from an arc spraying method, a plasma spraying method, a cold spraying method, a plating method, a dip coating method, a spin coating method, and the like.

(4) Method for Evaluating ZnO Element

Next, a method for evaluating the prepared ZnO element will be described.

(4.1) Varistor Voltage and Voltage Clamping Ratio (V-I Characteristic)

Voltage ($V_{1\ mA}$) when 1-mA current flows into the ZnO element is measured and is regarded as operating start voltage (varistor voltage). When the varistor voltage per unit thickness of the ZnO element is higher, the number of the voltage nonlinear resistors for use in the lightning arrester can be reduced further, which enables miniaturization of the lightning arrester.

Peak voltage ($V_{10\ kA}$) when 10-kA impulse current flows is measured, and a ratio of the peak voltage to the varistor voltage ($V_{10\ kA}/V_{1\ mA}$) is calculated and is regarded as the voltage clamping ratio. When this voltage clamping ratio is lower, this means that the ZnO element is more excellent in voltage nonlinearity.

(4.2) Temperature Characteristic

The varistor voltage is measured at 30° C. and 115° C., and a ratio between the varistor voltage values at the respective temperatures ($V_{1\ mA,\ 115°\ C.}/V_{1\ mA,\ 30°\ C.}$) is calculated and is regarded as the temperature characteristic. When this temperature characteristic value is lower, this means that the ZnO element is more excellent in thermal stability.

In the present invention, the voltage clamping ratio of 1.6 and the temperature coefficient of 0.95 are set as evaluation standards, and satisfaction of the voltage clamping ratio of less than 1.6 and the temperature characteristic of 0.95 or more is set as a passing standard. Also, in the voltage nonlinear resistor according to the present invention, the varistor voltage can be 400 V/mm or more, and can preferably be 600 V/mm or more.

Meanwhile, as for the voltage clamping ratio, values of 1.92 to 1.62 are standardized in accordance with the element size by JEC (Japanese Electrotechnical Committee) standards, and this means that an element having the voltage clamping ratio of less than 1.6 is excellent in voltage nonlinearity.

(4.3) $N_d$ and $N_{is}$ (C-V Characteristic)

Figure 2:
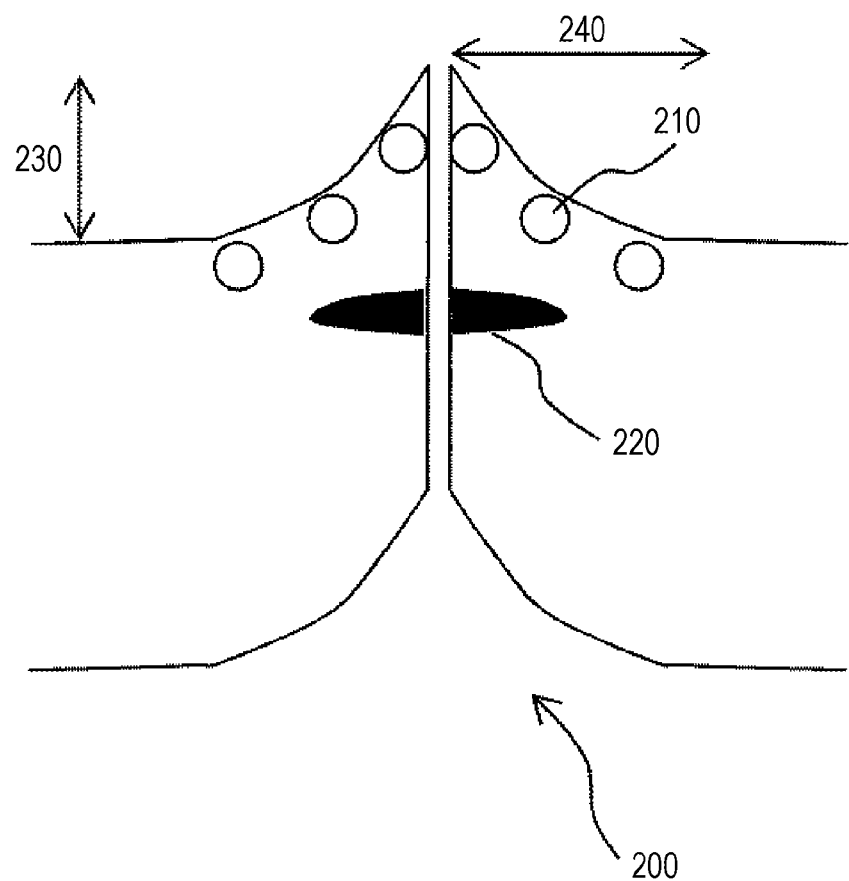
FIG. 2 is an energy state view at an interface of ZnO grains constituting a sintered body in FIG. 1.

FIG. 2 is an energy state view at an interface of the ZnO grains constituting the sintered body in FIG. 1. A model in which a ZnO element is an n-type semiconductor and exhibits nonlinear resistance by forming a double Schottky barrier 200 illustrated in FIG. 2 at a grain boundary between ZnO grains is proposed in Reference Literature 1 below.

Reference Literature 1: G. Blatter and F. Greuter, Phys. Rev., B33, 3952 (1986)

A C-V method is a method for evaluating an electron structure at this grain boundary. First, voltage is sequentially applied to the ZnO element, and a capacity therebetween (measurement frequency: 100 kHz) is measured. Thereafter, the average grain diameter of the ZnO grains is measured with use of a scanning electron microscope (SEM) or the like, and the aforementioned capacity is converted into a value per grain boundary. For measurement of the average grain diameter of the ZnO grains, a code method described in Reference Literature 2 below is used.

Reference Literature 2: Characterization Techniques of Ceramics, p 7, The Ceramic Society (1987)

A density ($N_d$) of a donor 210 and a barrier height (ϕ) 230 are calculated from a slope and an intercept of Equation (1) below. A density ($N_{is}$) of an interface state 220 is calculated from Equation (2) below. A width ($L_d$) of a depletion layer 240 is calculated from Equation (3) below. Methods for calculating these are described in detail in Reference Literature 3 and 4 below.

Reference Literature 3: Evaluation Methods for Ceramics, P 238 to P 247, Gihodo (1993)

Reference Literature 4: Mukae Kazuo: Dissertation, Tokyo Institute of Technology, p 55 (2001)

$$\left(\frac{1}{C(V)} - \frac{1}{2C(0)}\right)^2 = \frac{2}{q\epsilon N_d}\left(\frac{\phi}{q} + V\right) \qquad \text{Equation (1)}$$

$$N_{is} = \sqrt{\frac{2\varepsilon\phi N_d}{q^2}} \quad \text{Equation (2)}$$

$$L_d = \frac{1}{2}\frac{N_{is}}{N_d} \quad \text{Equation (3)}$$

In the equations, C is an average capacity per grain boundary, $\phi$ is a barrier height, q is electron charge (1.602× $10^{-19}$ C), $\varepsilon$ is a dielectric constant of the ZnO element, V is applied voltage, $N_d$ is a donor density, $N_{is}$ is an interface state density, and $L_d$ is a width of the depletion layer.

In a case of the ZnO element according to the present invention, to satisfy the voltage clamping ratio of less than 1.6 and the temperature characteristic of 0.95 or more, $N_d$ is preferably $6.5 \times 10^{17}$ cm$^{-3}$ or less, $N_{is}$ is preferably $3.7 \times 10^{12}$ cm$^{-2}$ or less, $\phi$ is preferably 1.80 eV or more, and $L_d$ is preferably 23 nm or more. A correlation between $N_d$ and $N_{is}$ and the voltage clamping ratio and a correlation between $N_d$ and $N_{is}$ and the temperature characteristic will be described in detail below. Hereinbelow, specific examples will be described.

Example 1

ZnO elements (No. 1 to 39) were prepared and evaluated in terms of the varistor voltage, the voltage clamping ratio, and the temperature characteristic. ZnO and additives were weighed to have predetermined amounts and were ground and mixed in a wet grinding and mixing device with use of zirconia beads. This mixture was supplied with polyvinyl alcohol (PVA) to prepare granulation slurry. This granulation slurry was granulated by a rotating-disk-type spray drier to prepare granulation powder.

The prepared granulation powder was put into a mold and was press-formed with use of a hydraulic press to prepare a molded body. The prepared molded body was then heated in the atmosphere at 500° C. to conduct a degreasing treatment and was further heated at 1080° C. to conduct a sintering treatment.

On the side surfaces of the obtained sintered body, glass frit was applied and thermally treated to form insulating layers. Thereafter, the upper and lower surfaces were polished, the polished surfaces were arc-sprayed with Al, to form electrodes. The diameter of the polished sintered body is 50 mm, and the thickness thereof is about 15 mm. Compositions of the sintered bodies constituting the ZnO elements (No. 1 to 39) are shown in Table 1, and evaluation results in terms of the voltage clamping ratio and the temperature characteristic are shown in Table 2. The unit of values for respective components in Table 1 is "mol %."

TABLE 1

| No. | Bi$_2$O$_3$ | Sb$_2$O$_3$ | B$_2$O$_3$ | MnCO$_3$ | Co$_3$O$_4$ | Cr$_2$O$_3$ | SiO$_2$ | NiO | Ag$_2$O | MgO | Al(NO$_3$)$_3$ | Y$_2$O$_3$ |
|---|---|---|---|---|---|---|---|---|---|---|---|---|
| 1 | 1.47 | 1.60 | 0.170 | 0.68 | 0.67 | 0.68 | 1.45 | 0.96 | 0.002 | 0.037 | 0.008 | 0.00 |
| 2 | 1.53 | 1.60 | 0.170 | 0.68 | 0.67 | 0.68 | 1.45 | 0.96 | 0.002 | 0.037 | 0.008 | 0.00 |
| 3 | 1.72 | 1.60 | 0.170 | 0.69 | 0.68 | 0.69 | 1.48 | 0.28 | 0.002 | 0.038 | 0.008 | 0.00 |
| 4 | 2.10 | 1.56 | 0.170 | 0.68 | 0.67 | 0.68 | 1.45 | 0.96 | 0.002 | 0.037 | 0.008 | 0.00 |
| 5 | 2.48 | 1.60 | 0.170 | 0.70 | 0.70 | 0.70 | 1.50 | 1.00 | 0.002 | 0.040 | 0.010 | 0.00 |
| 6 | 2.57 | 1.60 | 0.170 | 0.70 | 0.70 | 0.70 | 1.50 | 1.00 | 0.002 | 0.040 | 0.010 | 0.00 |
| 7 | 2.10 | 0.97 | 0.170 | 0.70 | 0.70 | 0.70 | 1.50 | 1.00 | 0.002 | 0.040 | 0.010 | 0.00 |
| 8 | 2.10 | 1.03 | 0.170 | 0.70 | 0.70 | 0.70 | 1.50 | 1.00 | 0.002 | 0.040 | 0.010 | 0.00 |
| 9 | 2.10 | 1.56 | 0.170 | 0.68 | 0.67 | 0.68 | 1.45 | 0.96 | 0.002 | 0.037 | 0.008 | 0.00 |
| 10 | 2.10 | 1.93 | 0.200 | 0.70 | 0.70 | 0.70 | 1.50 | 1.00 | 0.002 | 0.040 | 0.010 | 0.00 |
| 11 | 2.10 | 2.12 | 0.200 | 0.70 | 0.70 | 0.70 | 1.50 | 1.00 | 0.002 | 0.040 | 0.010 | 0.00 |
| 12 | 2.11 | 1.56 | 0.000 | 0.68 | 0.67 | 0.68 | 1.45 | 0.96 | 0.005 | 0.037 | 0.008 | 0.00 |
| 13 | 2.11 | 1.56 | 0.010 | 0.68 | 0.67 | 0.68 | 1.45 | 0.96 | 0.005 | 0.037 | 0.008 | 0.00 |
| 14 | 2.10 | 1.56 | 0.160 | 0.68 | 0.67 | 0.68 | 1.45 | 0.96 | 0.005 | 0.037 | 0.008 | 0.00 |
| 15 | 2.11 | 1.56 | 0.280 | 0.68 | 0.67 | 0.68 | 0.00 | 1.85 | 0.005 | 0.037 | 0.008 | 0.00 |
| 16 | 1.72 | 1.87 | 0.320 | 0.69 | 0.68 | 0.70 | 0.00 | 0.98 | 0.005 | 0.038 | 0.008 | 0.00 |
| 17 | 2.10 | 1.56 | 0.000 | 0.00 | 0.70 | 0.70 | 1.50 | 1.00 | 0.005 | 0.040 | 0.008 | 0.00 |
| 18 | 2.10 | 1.56 | 0.000 | 1.60 | 0.70 | 0.70 | 1.50 | 1.00 | 0.005 | 0.040 | 0.008 | 0.00 |
| 19 | 2.10 | 1.56 | 0.000 | 0.70 | 0.00 | 0.70 | 1.50 | 1.00 | 0.005 | 0.040 | 0.008 | 0.00 |
| 20 | 2.10 | 1.56 | 0.000 | 0.70 | 1.60 | 0.70 | 1.50 | 1.00 | 0.005 | 0.040 | 0.008 | 0.00 |
| 21 | 2.15 | 1.56 | 0.000 | 0.70 | 0.68 | 0.00 | 1.50 | 1.00 | 0.005 | 0.040 | 0.008 | 0.00 |
| 22 | 2.15 | 1.56 | 0.000 | 0.70 | 0.68 | 1.60 | 1.50 | 0.98 | 0.005 | 0.040 | 0.008 | 0.00 |
| 23 | 3.10 | 1.56 | 0.000 | 0.70 | 0.68 | 0.70 | 0.90 | 1.00 | 0.005 | 0.040 | 0.008 | 0.00 |
| 24 | 2.10 | 1.56 | 0.000 | 0.70 | 0.68 | 0.70 | 2.60 | 1.00 | 0.005 | 0.040 | 0.008 | 0.00 |
| 25 | 2.10 | 1.56 | 0.000 | 0.70 | 0.68 | 0.70 | 1.50 | 0.00 | 0.005 | 0.040 | 0.008 | 0.00 |
| 26 | 2.10 | 1.56 | 0.000 | 0.70 | 0.68 | 0.70 | 1.50 | 2.10 | 0.005 | 0.040 | 0.008 | 0.00 |
| 27 | 2.10 | 1.56 | 0.000 | 0.70 | 0.68 | 0.70 | 1.50 | 1.00 | 0.000 | 0.040 | 0.008 | 0.00 |
| 28 | 2.10 | 1.56 | 0.000 | 0.70 | 0.68 | 0.70 | 1.50 | 1.00 | 0.020 | 0.040 | 0.008 | 0.00 |
| 29 | 2.10 | 1.56 | 0.000 | 0.70 | 0.68 | 0.70 | 1.50 | 1.00 | 0.005 | 0.000 | 0.008 | 0.00 |
| 30 | 2.10 | 1.56 | 0.000 | 0.70 | 0.68 | 0.70 | 1.50 | 1.00 | 0.005 | 0.140 | 0.008 | 0.00 |
| 31 | 2.10 | 1.56 | 0.000 | 0.70 | 0.68 | 0.70 | 1.50 | 1.00 | 0.005 | 0.040 | 0.000 | 0.00 |
| 32 | 2.10 | 1.56 | 0.000 | 0.70 | 0.68 | 0.70 | 1.50 | 1.00 | 0.005 | 0.040 | 0.060 | 0.00 |
| 33 | 2.11 | 1.60 | 0.000 | 0.70 | 0.68 | 0.70 | 1.50 | 0.96 | 0.005 | 0.040 | 0.008 | 1.45 |
| 34 | 2.11 | 1.60 | 0.000 | 0.70 | 0.68 | 0.70 | 1.50 | 0.96 | 0.005 | 0.040 | 0.008 | 2.53 |
| 35 | 2.53 | 0.91 | 0.170 | 0.68 | 0.67 | 0.00 | 1.45 | 1.84 | 0.002 | 0.037 | 0.008 | 0.00 |
| 36 | 1.72 | 1.87 | 0.350 | 0.69 | 0.68 | 0.00 | 0.00 | 0.98 | 0.002 | 0.038 | 0.008 | 0.00 |
| 37 | 2.56 | 0.93 | 0.348 | 0.69 | 0.68 | 0.00 | 0.74 | 0.97 | 0.000 | 0.038 | 0.008 | 0.00 |
| 38 | 2.50 | 0.93 | 0.348 | 0.69 | 0.68 | 0.00 | 0.74 | 0.97 | 0.000 | 0.038 | 0.008 | 0.00 |
| 39 | 2.15 | 0.93 | 0.349 | 0.69 | 0.68 | 0.69 | 0.75 | 0.28 | 0.002 | 0.038 | 0.008 | 0.00 |

TABLE 2

| No. | Voltage Clamping Ratio | Temperature Characteristic |
| --- | --- | --- |
| 1 | 1.61 | 0.94 |
| 2 | 1.59 | 0.96 |
| 3 | 1.52 | 1.00 |
| 4 | 1.57 | 0.97 |
| 5 | 1.59 | 0.96 |
| 6 | 1.62 | 0.94 |
| 7 | 1.62 | 0.93 |
| 8 | 1.59 | 0.96 |
| 9 | 1.57 | 0.97 |
| 10 | 1.59 | 0.96 |
| 11 | 1.61 | 0.95 |
| 12 | 1.48 | 1.00 |
| 13 | 1.48 | 1.00 |
| 14 | 1.54 | 0.97 |
| 15 | 1.55 | 0.96 |
| 16 | 1.54 | 0.93 |
| 17 | 1.62 | 0.93 |
| 18 | 1.61 | 0.94 |
| 19 | 1.63 | 0.94 |
| 20 | 1.61 | 0.95 |
| 21 | 1.63 | 0.95 |
| 22 | 1.62 | 0.95 |
| 23 | 1.58 | 0.94 |
| 24 | 1.63 | 0.95 |
| 25 | 1.65 | 0.93 |
| 26 | 1.65 | 0.93 |
| 27 | 1.63 | 0.97 |
| 28 | 1.53 | 0.94 |
| 29 | 1.62 | 0.90 |
| 30 | 1.63 | 0.94 |
| 31 | 1.63 | 0.95 |
| 32 | 1.55 | 0.93 |
| 33 | 1.50 | 1.00 |
| 34 | 1.64 | 0.94 |
| 35 | 1.57 | 0.88 |
| 36 | 1.56 | 0.93 |
| 37 | 1.61 | 0.86 |
| 38 | 1.61 | 0.86 |
| 39 | 1.60 | 0.94 |

In Table 1 shown above, all of the elements achieve the varistor voltage of 400 V/mm. As shown in Table 1, it is apparent that the ZnO elements in each of which the sintered body has a preferable composition according to the present invention (No. 2 to 5, 8, 9, 12 to 15, and 33) achieve the voltage clamping ratio of less than 1.6 and the temperature characteristic of 0.95 or more. On the other hand, it is apparent that the ZnO elements in each of which the sintered body has a composition out of the preferable composition range according to the present invention (No. 1, 6, 7, 11, 16 to 32, and 34 to 39) do not satisfy at least either the voltage clamping ratio of less than 1.6 or the temperature characteristic of 0.95 or more and cannot balance the varistor voltage, the voltage clamping ratio, and the temperature characteristic of the ZnO elements at a high level.

As in No. 1 to No. 6, in a case in which $Bi_2O_3$ is less than 1.5 mol % (No. 1) or more than 2.5 mol % (No. 6), the voltage clamping ratio is more than 1.6, and the temperature characteristic is less than 0.95.

As in No. 7 to No. 11, in a case in which $Sb_2O_3$ is less than 1.0 mol % (No. 7) or more than 2.0 mol % (No. 10 and 11), the voltage clamping ratio is more than 1.6, and as for No. 7, the temperature characteristic is less than 0.95.

As in No. 12 to No. 16, in a case in which $B_2O_3$ is more than 0.3 mol % (No. 16), the temperature characteristic is less than 0.95.

As in No. 17 to No. 32, it is apparent that No. 17 and 18, in which $MnCO_3$ is out of the range of from 0.1 to 1.5 mol %, No. 19 and 20, in which $Co_3O_4$ is out of the range of from 0.1 to 1.5 mol %, No. 21 and 22, in which $Cr_2O_3$ is out of the range of from 0.1 to 1.5 mol %, No. 23 and 24, in which $SiO_2$ is out of the range of from 1 to 2.5 mol %, No. 25 and 26, in which NiO is out of the range of from 0.1 to 2 mol %, No. 27 and 28, in which $Ag_2O$ is out of the range of from 0.001 to 0.01 mol %, No. 29 and 30, in which MgO is out of the range of from 0.01 to 0.1 mol %, and No. 31 and 32, in which $Al(NO_3)_3$ is out of the range of from 0.005 to 0.5 mol %, cannot satisfy both the voltage clamping ratio of less than 1.6 and the temperature characteristic of 0.95 or more.

No. 33, in which $RE_2O_3(Y_2O_3)$ is 2.5 mol % or less, can satisfy both the voltage clamping ratio of less than 1.6 and the temperature characteristic of 0.95 or more. However, in No. 34, in which $RE_2O_3(Y_2O_3)$ is more than 2.5 mol %, the voltage clamping ratio is more than 1.6, and the temperature characteristic is less than 0.95. No. 35 to No. 39, in which the contents of two or more accessory components are out of the preferable composition range according to the present invention, cannot satisfy both the voltage clamping ratio of less than 1.6 and the temperature characteristic of 0.95 or more.

Example 2

The C-V measurement for No. 3, No. 4, No. 9, No. 12 to No. 16, No. 33, and No. 35 to No. 39 in Table 1 was conducted. Table 3 shows values of $N_d$ and $N_{is}$ obtained from the C-V measurement.

TABLE 3

| No. | $N_d$ ($\times 10^{17}$ cm$^{-3}$) | $N_{is}$ ($\times 10^{12}$ cm$^{-2}$) |
| --- | --- | --- |
| 3 | 3.89 | 2.54 |
| 4 | 3.67 | 2.40 |
| 9 | 3.67 | 2.40 |
| 12 | 1.95 | 2.15 |
| 13 | 1.88 | 2.30 |
| 14 | 4.56 | 3.15 |
| 15 | 5.83 | 3.27 |
| 16 | 6.59 | 3.40 |
| 33 | 2.27 | 2.20 |
| 35 | 12.08 | 4.37 |
| 36 | 6.59 | 3.20 |
| 37 | 9.13 | 3.81 |
| 38 | 9.13 | 3.81 |
| 39 | 9.48 | 3.93 |

Figure 3:
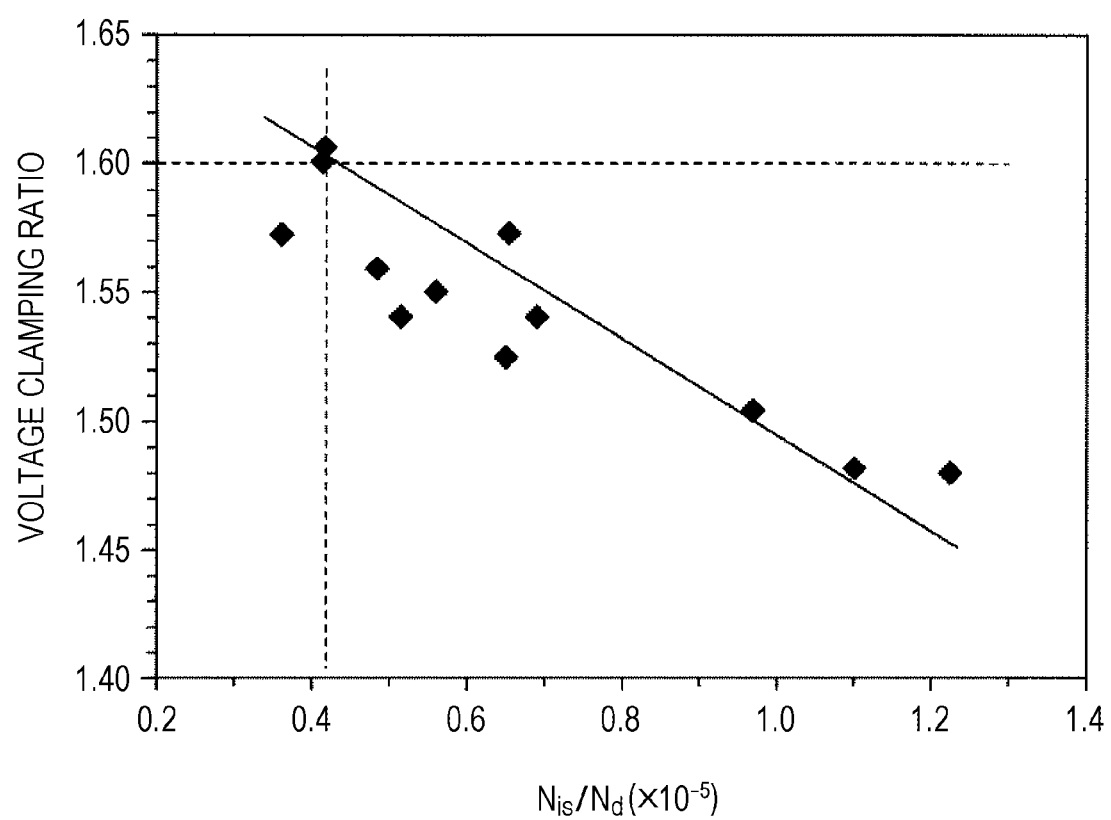
FIG. 3 is a graph illustrating relationship between a voltage clamping ratio and $N_{is}/N_d$.
Figure 4:
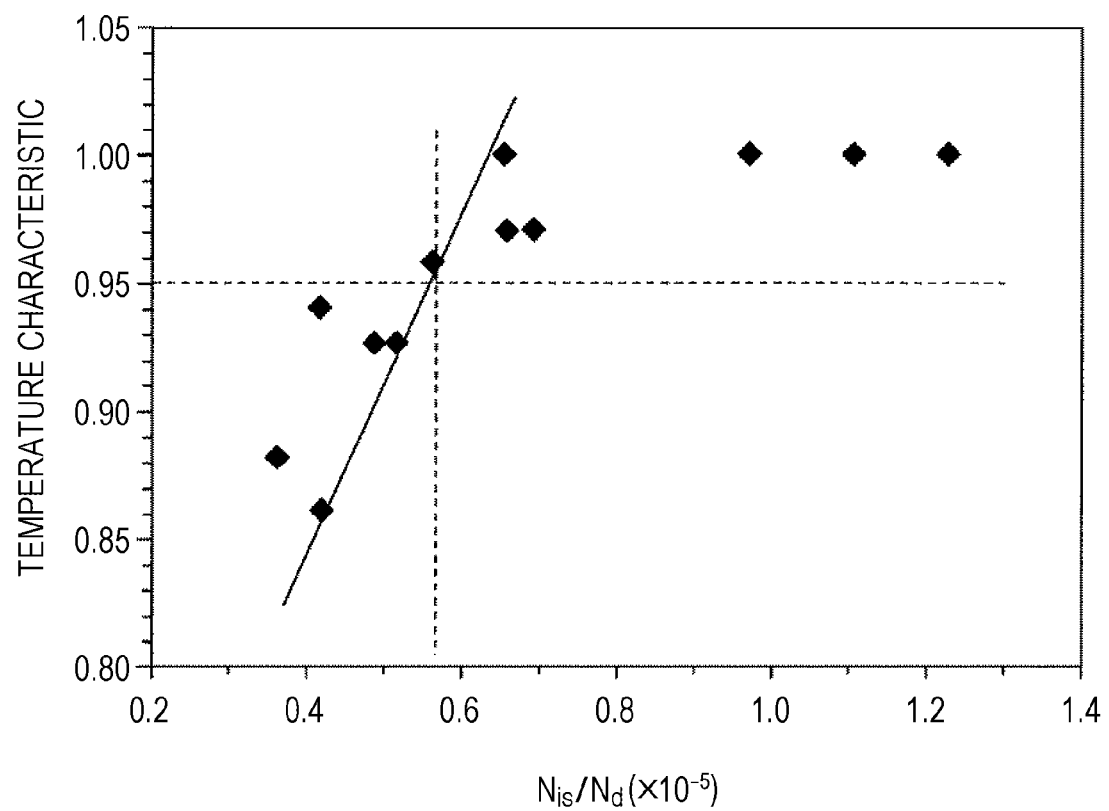
FIG. 4 is a graph illustrating relationship between a temperature characteristic and $N_{is}/N_d$.

FIG. 3 is a graph illustrating relationship between the voltage clamping ratio and $N_{is}/N_d$, and FIG. 4 is a graph illustrating relationship between the temperature characteristic and $N_{is}/N_d$. As illustrated in FIG. 3, when $N_{is}/N_d$ is $0.42 \times 10^{-5}$ or more, the voltage clamping ratio is less than 1.6. Also, as illustrated in FIG. 4, when $N_{is}/N_d$ is $0.57 \times 10^{-5}$ or more, the temperature characteristic is 0.95 or more.

Figure 5:
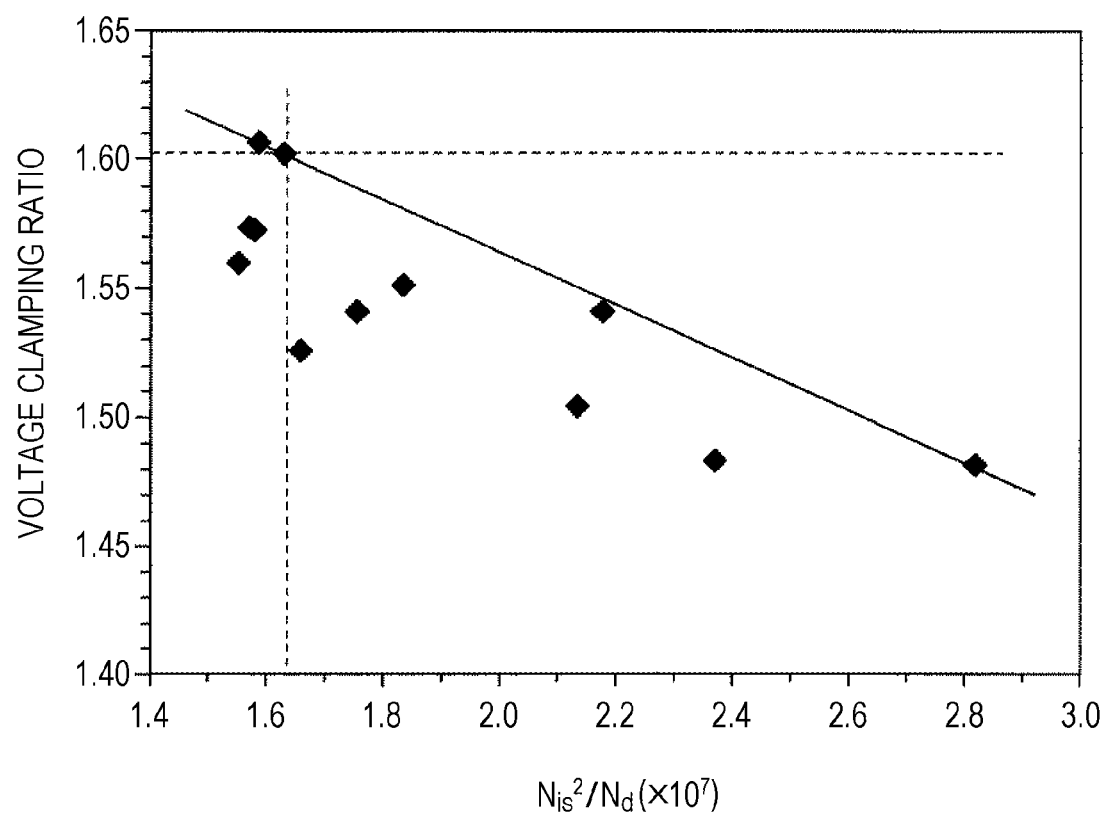
FIG. 5 is a graph illustrating relationship between the voltage clamping ratio and $N_{is}^2/N_d$.
Figure 6:
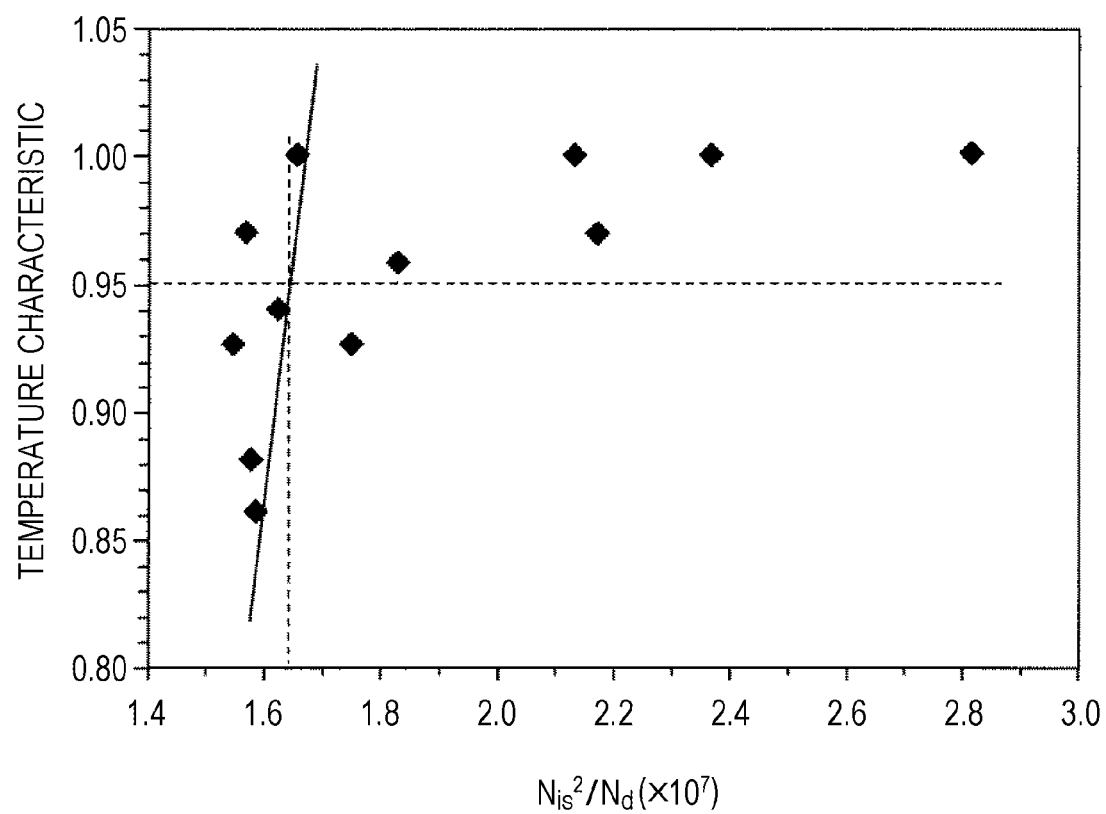
FIG. 6 is a graph illustrating relationship between the temperature characteristic and $N_{is}^2/N_d$.

FIG. 5 is a graph illustrating relationship between the voltage clamping ratio and $N_{is}^2/N_d$, and FIG. 6 is a graph illustrating relationship between the temperature characteristic and $N_{is}^2/N_d$. As illustrated in FIG. 5, when $N_{is}^2/N_d$ is $1.63 \times 10^7$ or more, the voltage clamping ratio is less than 1.6. Also, as illustrated in FIG. 6, when $N_{is}^2/N_d$ is $1.65 \times 10^7$ or more, the temperature characteristic is 0.95 or more.

From the above results, when $N_{is}/N_d$ is $0.57 \times 10^{-5}$ or more, or when $N_{is}^2/N_d$ is $1.65 \times 10^7$ or more, both the voltage clamping ratio of less than 1.6 and the temperature characteristic of 0.95 or more can be satisfied.

Example 3

Figure 7:
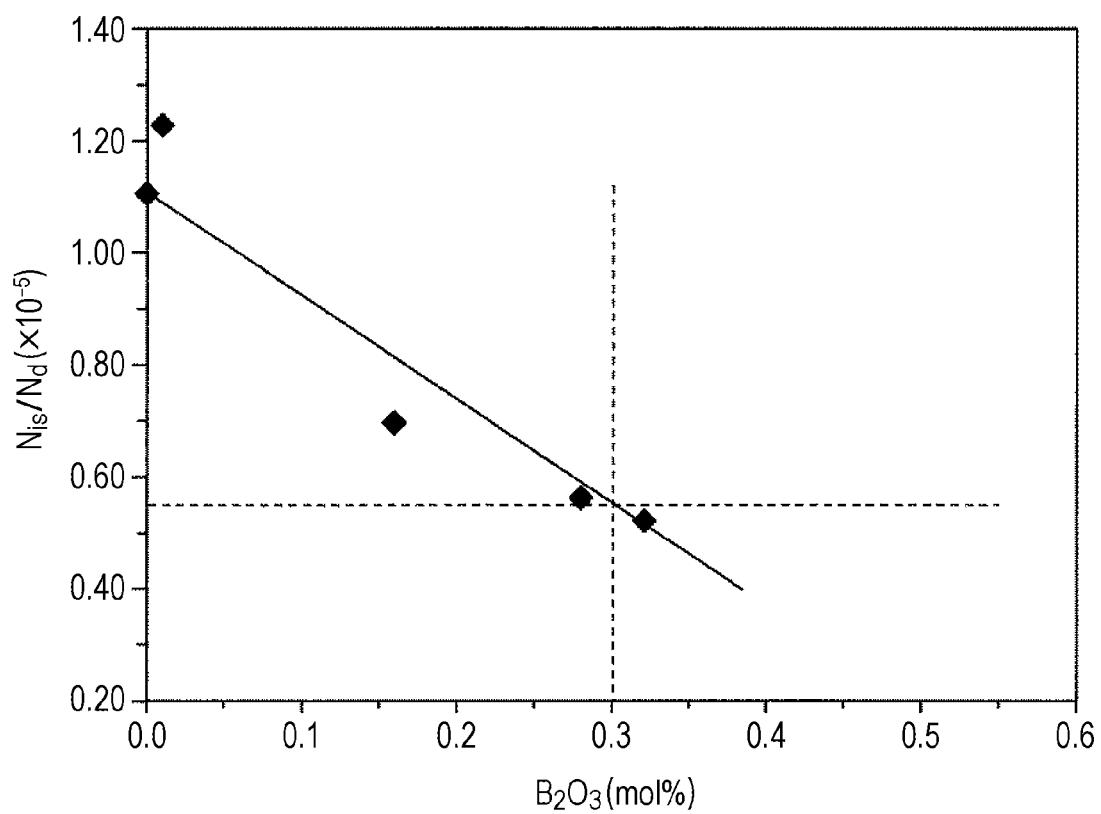
FIG. 7 is a graph illustrating relationship between $N_{is}/N_d$ and the content of $B_2O_3$.
Figure 8:
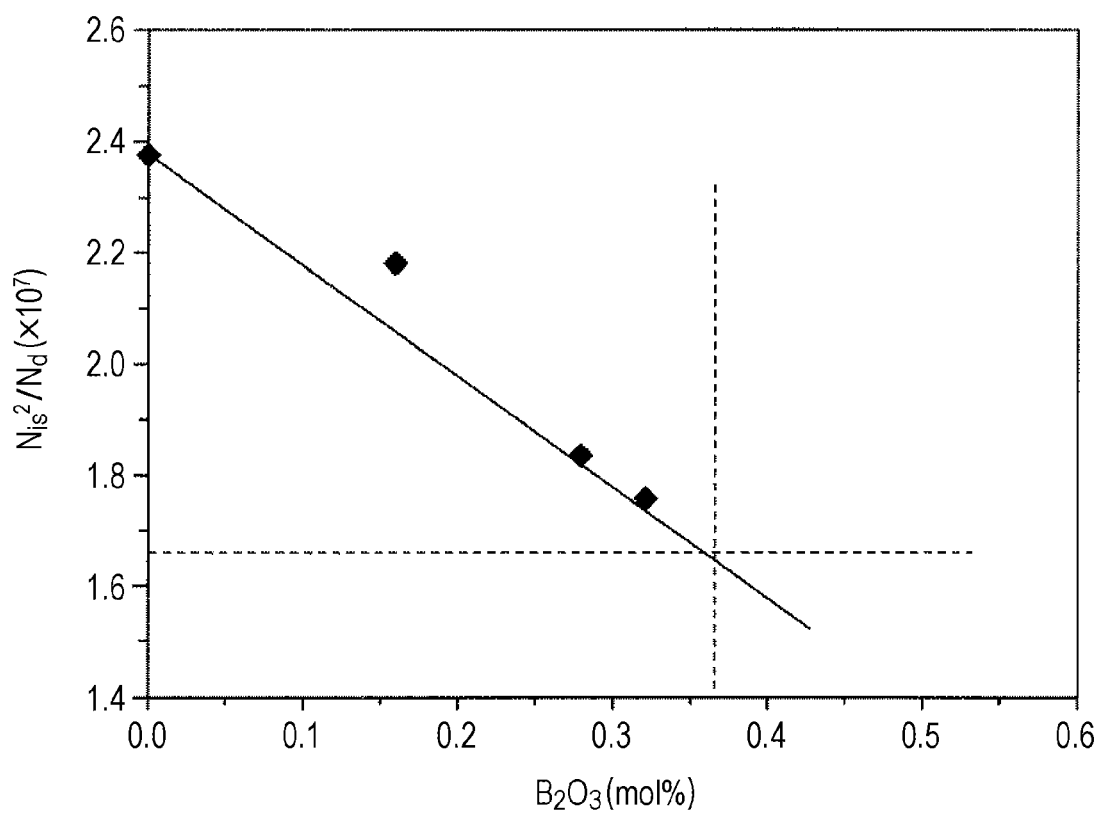
FIG. 8 is a graph illustrating relationship between $N_{is}^2/N_d$ and the content of $B_2O_3$.

FIG. 7 is a graph illustrating relationship between $N_{is}/N_d$ and the content of $B_2O_3$, and FIG. 8 is a graph illustrating relationship between $N_{is}^2/N_d$ and the content of $B_2O_3$. As illustrated in FIG. 7, when the content of $B_2O_3$ is 0.3 mol % or less, $N_{is}/N_d$ is $0.57\times10^{-5}$ or more. Also, as illustrated in FIG. 8, when the content of $B_2O_3$ is 0.37 mol % or less, $N_{is}^2/N_d$ is $1.65\times10^7$ or more.

From the above results, when the content of $B_2O_3$ is 0.3 mol % or less, $N_{is}/N_d$ is $0.67\times10^{-5}$ or more, and $N_{is}^2/N_d$ is $1.65\times10^7$ or more. In this case, the voltage clamping ratio of less than 1.6 and the temperature characteristic of 0.95 or more can be achieved.

Example 4

With use of the sintered bodies having compositions of No. 13 and No. 36 in Table 1, a ZnO element 85 mm in diameter and a ZnO element 100 mm in diameter (the thickness is 15 mm each) were prepared, and a life test was conducted. In a test method, voltage 85% of the varistor voltage of each size element was successively applied at a test temperature of 115° C., and measurement was conducted to examine temporal changes of the current value.

Figure 9:
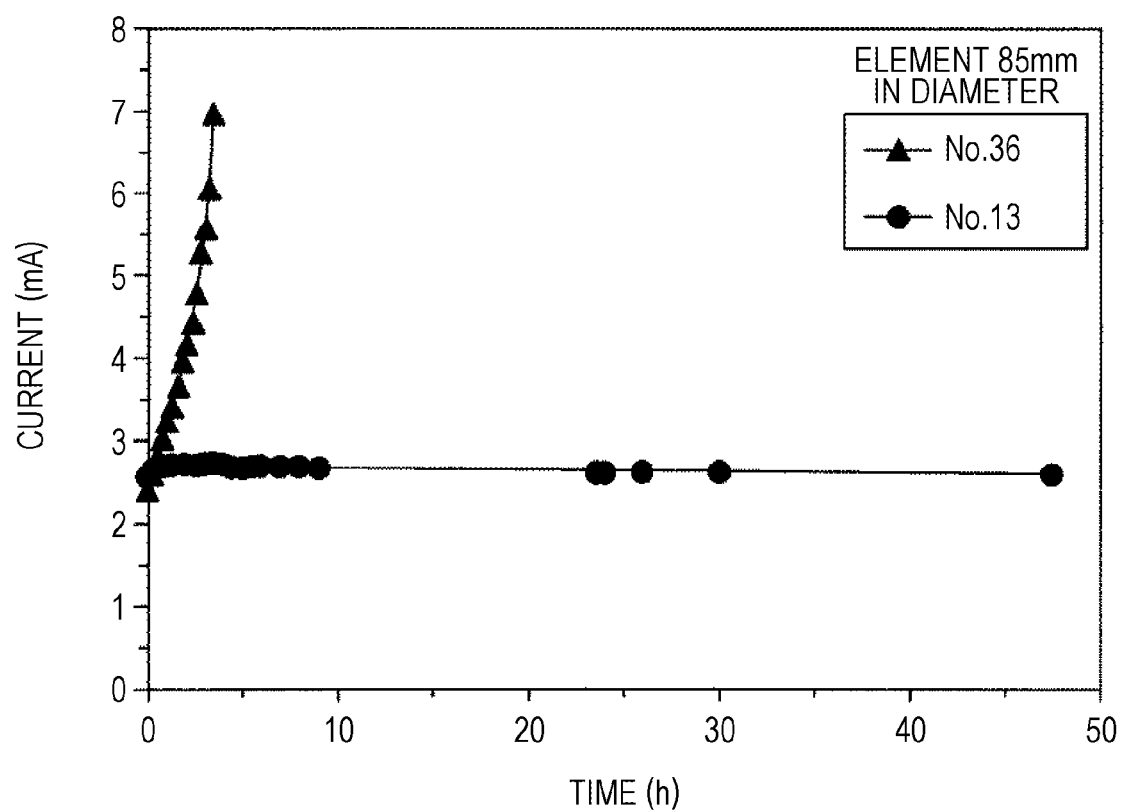
FIG. 9 is a graph illustrating a result of a life test (element 85 mm in diameter)
Figure 10:
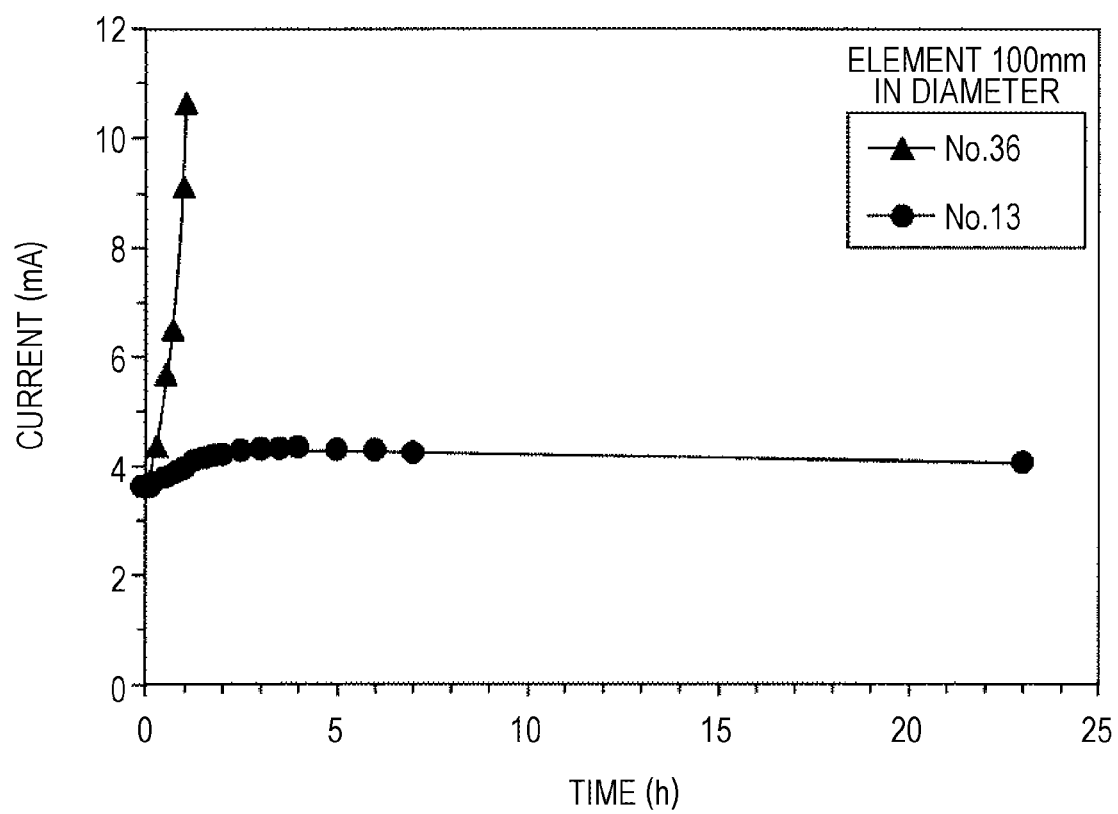
FIG. 10 is a graph illustrating a result of the life test (element 100 mm in diameter).

FIG. 9 is a graph illustrating a result of the life test (element 85 mm in diameter), and FIG. 10 is a graph illustrating a result of the life test (element 100 mm in diameter). As illustrated in FIGS. 9 and 10, while the current value of No. 13 of each size is approximately constant and thermally stable, the current value of No. 36 drastically increases within several hours from the start and is in a state of thermal runaway. This shows that, while No. 13, in which the temperature characteristic is 0.95 or more, is thermally stable, No. 36, in which the temperature characteristic is less than 0.95, has no sufficient thermal stability.

Example 5

With use of the sintered bodies having compositions of No. 12 and No. 30 in Table 1, a ZnO element 50 mm in diameter (the thickness is 15 mm) was prepared, and a withstand test and evaluation were conducted. In the withstand test, two kinds of tests, an impulse withstand test for applying two 65-kA impulse current pulses and a square wave withstand test for applying eighteen 200-V 2-ms square waves, were conducted. While the No. 12 element was not broken in any of the tests, the No. 30 element was cracked after the second pulse application in the impulse test and was cracked after the sixth wave application in the square wave test. It is apparent from the results that the ZnO element (No. 12) using the sintered body having the preferable composition according to the present invention has a sufficient energy withstand characteristic and can achieve miniaturization.

As described above, it has been proved that the present invention can provide the voltage nonlinear resistor in which the varistor voltage, the voltage clamping ratio, and the temperature characteristic are balanced at a high level. It has also been proved that the ZnO element according to the present invention satisfies a sufficient degree of life and withstand characteristic.

The present invention is not limited to the foregoing embodiments and includes various modification examples. For example, the foregoing embodiments have been described in detail to facilitate understanding of the present invention, and the present invention is not limited to one including all of the components described herein. Also, some components of one embodiment can be substituted with components of another embodiment, and components of another embodiment can be added to components of one embodiment. Further, some components of each embodiment can be added, deleted, and substituted with other components.

What is claimed is:

1. A voltage nonlinear resistor comprising:
a sintered body consisting of zinc oxide having an average grain diameter of 5 μm or less, as a primary component, and containing, as accessory components, bismuth, antimony and boron, and containing manganese (Mn), cobalt (Co), chromium (Cr), nickel (Ni), aluminum (Al), silver (Ag), silicon (Si), magnesium (Mg) and rare earth elements (RE) as additive components, wherein
a content of the accessory components is bismuth oxide of 1.5 to 2.5 mol %, antimony oxide of 1 to 2 mol %, and boron oxide of 0.3 mol % or less in terms of oxides,
the Mn, Co, and Cr are 0.1 to 1.5 mol % in terms of $MnCO_3$, $Co_3O_4$, and $Cr_2O_3$, respectively,
the Ni is 0.1 to 2 mol % in terms of NiO,
the Al is 0.005 to 0.5 mol % in terms of $Al(NO_3)3$,
the Ag is 0.001 to 0.01 mol % in terms of $Ag_2O$,
the Si is 1.0 to 2.5 mol % in terms of $SiO_2$,
the Mg is 0.01 to 0.1 mol % in terms of MgO,
the RE is 2.5 mol % or less in terms of $RE_2O_3$.

2. The voltage nonlinear resistor according to claim 1, wherein:
Equations (1) and (2) are satisfied:

$$N_{is}/N_d \geq 0.57\times10^{-5} \qquad \text{Equation (1)}$$

$$N_{is}^2/N_d \geq 1.65\times10^7 \qquad \text{Equation (2)}$$

(in Equations (1) and (2), $N_{is}$ is an interface state density at a grain boundary of the zinc oxide, and $N_d$ is a donor density at a grain boundary of the zinc oxide).

3. The voltage nonlinear resistor according to claim 1, wherein:
when voltage when 1-mA current flows into the voltage nonlinear resistor is $V_{1\ mA}$, and when peak voltage when 10-kA impulse current flows into the voltage nonlinear resistor is $V_{10\ kA}$, a voltage clamping ratio $V_{10\ kA}/V_{1\ mA}$ is less than 1.6, and when voltage when 1-mA current flows into the voltage nonlinear resistor at 115° C. is $V_{1\ mA,\ 115°\ C.}$, and when voltage when 1-mA current flows into the voltage nonlinear resistor at 30° C. is $V_{1\ mA,\ 30°\ C.}$, a temperature characteristic $V_{1\ mA,\ 115°\ C.}/V_{1\ mA,\ 30°\ C.}$ is 0.95 or more.

4. The voltage nonlinear resistor according to claim 2, wherein:
when voltage when 1-mA current flows into the voltage nonlinear resistor is $V_{1\ mA}$, and when peak voltage when 10-kA impulse current flows into the voltage nonlinear resistor is $V_{10\ kA}$, a voltage clamping ratio $V_{10\ kA}/V_{1\ mA}$ is less than 1.6, and when voltage when 1-mA current flows into the voltage nonlinear resistor at 115° C. is $V_{1\ mA,\ 115°\ C.}$, and when voltage when 1-mA current flows into the voltage nonlinear resistor at 30° C. is $V_{1\ mA,\ 30°\ C.}$, a temperature characteristic $V_{1\ mA,\ 115°\ C.}/V_{1\ mA,\ 30°\ C.}$ is 0.95 or more.

5. The voltage nonlinear resistor according to claim 1, wherein:
wherein a content of the chromium and the magnesium is chromium oxide of 0.1 to 1.5 mol % and magnesium oxide of 0.01 to 0.1 mol % in terms of oxide.

* * * * *